United States Patent [19]

French

[11] Patent Number: 5,034,841
[45] Date of Patent: Jul. 23, 1991

[54] DEVICE FOR COUNTING THE USAGE OF A TAPE CASSETTE AND METHOD FOR ITS MANUFACTURE

[76] Inventor: Furman French, 8405 Snaresbrook Rd., Roscoe, Ill. 61073

[21] Appl. No.: 327,904

[22] Filed: Mar. 23, 1989

Related U.S. Application Data

[63] Continuation-in-part of Ser. No. 132,715, Dec. 11, 1987, abandoned, which is a continuation-in-part of Ser. No. 893,351, Aug. 5, 1986, abandoned.

[51] Int. Cl.⁵ .................. G11B 23/02; G11B 15/32
[52] U.S. Cl. ............................... 360/132; 242/199
[58] Field of Search .................... 360/132, 137; 242/198-200

[56] References Cited

U.S. PATENT DOCUMENTS

| | | | |
|---|---|---|---|
| 4,466,584 | 8/1984 | Chevalier | 242/199 |
| 4,575,778 | 3/1986 | Vogelgesang | 360/132 |
| 4,802,048 | 1/1989 | Perkins et al. | 360/132 |
| 4,823,223 | 4/1989 | Hirose et al. | 360/132 |
| 4,913,915 | 2/1990 | Iwahashi | 242/198 |
| 4,918,558 | 4/1990 | Igarashi et al. | 360/132 |

Primary Examiner—John H. Wolff
Attorney, Agent, or Firm—Eric P. Schellin

[57] ABSTRACT

A tape cassette assembly consisting of support mountings being specially disposed and based on a casing, the support mountings adapted for rotating a take up reel and a supply reel, a two state stable device mounted on the casing interpositioned between the take up reel and the supply reel, and including an articulated member positionable to indicate alternative states of stability, a follower mounted on the articulated member adapted for engagement with the tape filled on the take up reel or on the supply reel as one of the reels approaches a fill condition, and positive displacement member for the two state stable device for displacing the two state stable device from one alternative state of stability to another alternative state.

3 Claims, 3 Drawing Sheets

FRONT

FRONT →

1

DEVICE FOR COUNTING THE USAGE OF A TAPE CASSETTE AND METHOD FOR ITS MANUFACTURE

This application is a continuation-in-part application of my invention claimed in U.S. patent application Ser. No. 132,715 filed Dec. 11, 1987, which in turn is a continuation-in-part of my invention claimed in U.S. patent application Ser. No. 893,351 filed Aug. 05, 1986, each titled A Device For Counting The Usage Of A Tape, and each now abandoned.

BACKGROUND OF THE INVENTION

1. Field of the Invention

The invention relates to a device for counting the number of times or events a tape cassette has been played, and more particularly the invention is directed to specifics of the details of a device for monitoring uses of video cassette storage devices.

The invention relates further to a tape cassette assembly consisting of support mountings being spacially disposed and based on a casing, the support mountings adapted for rotating a take up reel and a supply reel, a two state stable device mounted on the casing interpositioned between the take-up reel and the supply reel, and including an articulated member positionable to indicate alternative states of stability, a follower mounted on the articulated member adapted for engagement with the tape filled on the take-up reel and the supply reel as one of the reels approaches a fill condition, and positive displacement member for the two state stable device for displacing the two state stable device from one alternative state of stability to another alternative state, and the method of constructing and manufacture thereof as more particularly described herein.

2. Description of the Prior Art

Various prior art devices for counting usage of a tape cassettes and method for its manufacture, and the like, as well as apparatus and method of their construction in general, are found to be known and exemplary of the U.S. and the British prior art, are the following:

|  | | |
|---|---|---|
| | 3,604,624 | Miura |
| | 3,899,660 | Karube |
| | 4,274,605 | Gruber, Jr. |
| | 4,466,584 | Chevalier et al |
| | 4,554,443 | Lambert et al |
| | 4,575,778 | Vogelgesang |
| U.K. | 1,284,020 | Sony Corporation |
| U.K. | 1,312,085 | Sony Corporation |
| U.K. | 1,448,375 | Harris |

Presently magnetic tape is widely used as a recording medium to record audio information, video information and computer information and data for use as software in computer systems. For convenience most tape is packaged in spiral or roll configuration on a reel within a cassette. The cassette typically consists of a supply reel in which the tape is secured and wound and a take-up reel to which the tape is transferred during the playing or recording process. A user merely places the tape cassette into a recorder adapted therefor, such as a video cassette recorder, which automatically engages the tape of the cassette for play. When the recorder is actuated, the magnetic tape is transferred from the supply reel to the take-up reel past a magnetic head that decodes or detects the magnetization of the tape in the form of information stored therein. One of the recent growth areas in magnetic tape usage has been the advent of video cassette recorder as a device to record and replay television and movie program materials. These cassettes can be purchased outright or rented for short term use from libraries, stores or similar establishments. Typically, the user or subscriber or member of a user group or the rental facility leases for a day or few days the video cassette containing the program or movie for relatively small charge, and under usual circumstances, the subscriber or member can then, if found desirable, play the movie or program continually over the entire rental period and not incur any additional expense, not withstanding copyright performance rights; furthermore, the subscriber can lend the cassette to a series of people each of whom may play the cassette over and over again. As usual, it becomes impossible for the video cassette recorder rental center or owner of the cassette to account and monitor actual and ultimate performance rights and how many times a cassette has been viewed or played.

These patents or known prior uses teach and disclose various types of devices for counting the usage of a tape cassette and method for its manufacture and of various manufactures and the like as well as methods of their construction, but none of them whether taken singly or in combination disclose the specific details of the combination of the invention in such a way as to bear upon the claims of the present invention. The present invention is a departure from and improvement over prior art contained in my invention claimed in U.S. patent applications Ser. No. 893,351 filed Aug. 05, 1986 and Ser. No. 132,715 filed Dec. 11, 1987, each titled A Device For Counting The Usage Of A Tape, now abandoned, and which is incorporated herein by reference.

SUMMARY OF THE INVENTION

An object, advantage and feature of the invention is to provide a novel tape cassette assembly consisting of support mountings being spacially disposed and based on a casing, the support mountings adapted for rotating a take-up reel and a supply reel, a two state stable device mounted on the casing interpositioned between the take up reel and the supply reel, and including an articulated member positionable to indicate alternative states of stability, a follower mounted on the articulated member adapted for engagement with the tape filled on the take-up reel and the supply reel as one of the reels approaches a fill condition, and positive displacement member for the two state stable device for displacing the two state stable device from one alternative state of stability to another alternative state.

Another object of the invention is directed further to a device providing for a pivoting means provided with a biassing means for biassing the pivoting means and feeler arms from the second position into the first position when the second feeler arm contacts the magnetic tape wound on the supply reel, and for biassing the pivoting means and the feeler arms from the first position into the second position when the first feeler arm contacts the magnetic tape on the take-up reel.

A further and additional object of the invention is to provide a source of electrical energy which is electrically coupled to the counting means and the sensing means. The sensing members forms an electrical switch for electrically coupling and decoupling the supply of electrical energy to the counting means, thereby providing an electrical signal indicating the number of times a magnetic tape has been played.

Also an object of the invention is to provide a simple and direct method for the improved construction of a tape cassette use reader having, as a source of electrical energy, a battery, and the counting member is electrically triggered to count a unit when the pivoting means and feeler means are moved from the first position into the second position, and reset when the pivoting means and feeler means are moved from the second position into the first position.

These together with other objects and advantages which will become subsequent apparent reside in the details of the process and operation thereof as more fully hereinafter is described and claimed, reference being had to the accompanying drawings forming a part hereof, wherein like numerals refer to like parts throughout.

DESCRIPTION OF A PREFERRED EMBODIMENT OF THE INVENTION

Figure 1:
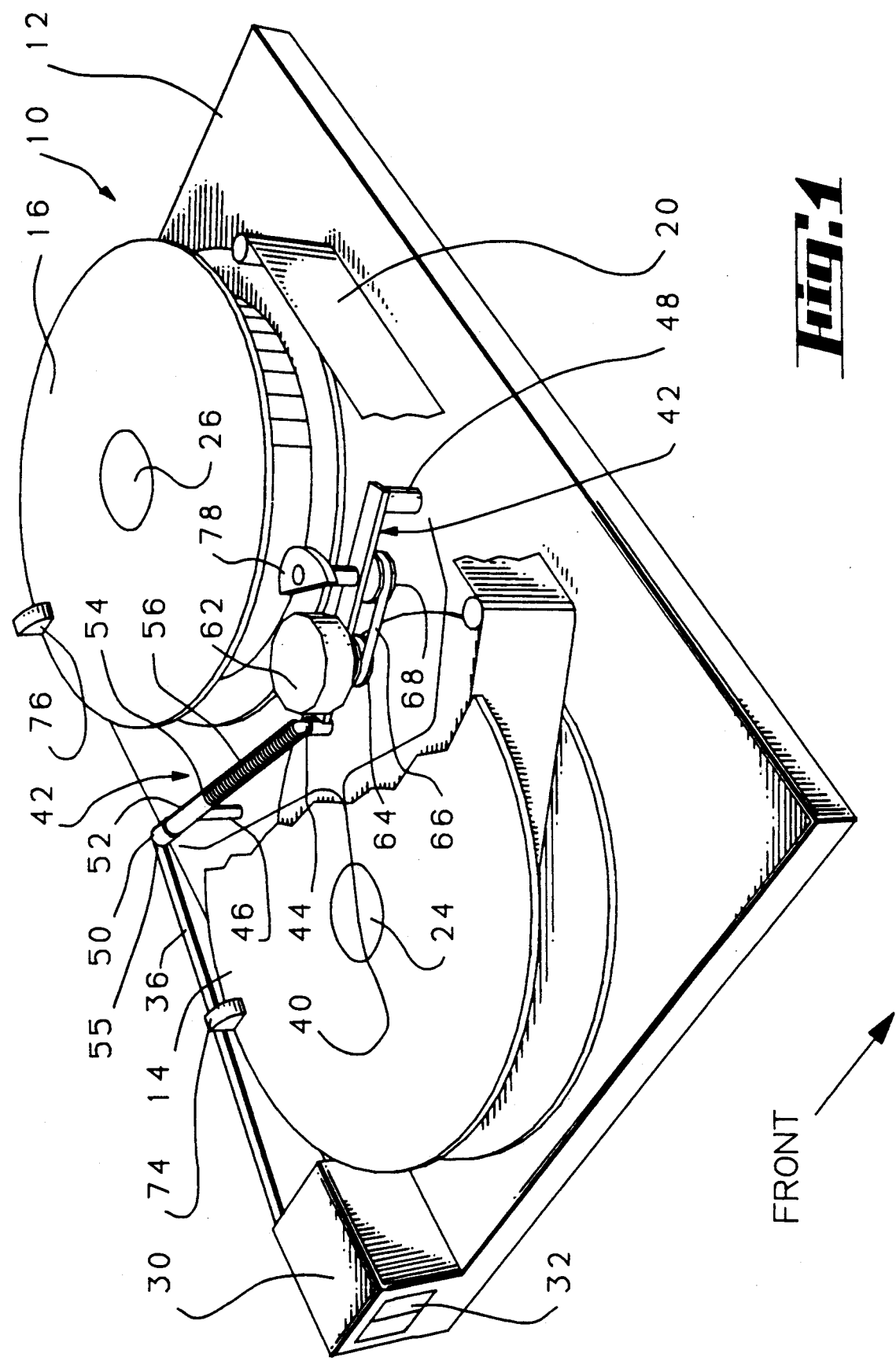
FIG. 1 is a broken-away perspective view of the invention of showing details and inner mechanism of a video cassette having two reels and illustrating a typical installation of a device for counting the usage of a tape according to a preferred embodiment and best mode of the present invention.

Referring now to the drawings there is shown in FIG. 1 a video recorder cassette 10 having a base or structural casing 12 supporting take up reel 14 and supply reel 16, each mounted for rotation about respective hubs and pivot members 24, 26. Film on tape 20, generally magnetic, is fed or supplied from the supply reel 16 to the take-up reel 14, and when desired, is run in reverse in order to replay in the usual manner. A magnetic head or reader device (not shown) is disposed proximate the edge of the casing 12 and proximate the tape as it feeds and transverses across the head or recorder as the tape 20 from the supply reel 16 to the take-up reel 14.

Included in the casing 12 is a mechanically actuable counter mechanism 30 having therein at least two counting wheels or disks 32 with digital indicia (not shown) thereon, as is well known in the prior art; the counter mechanism 30 is actuable by movement or displacement, or mechanical displacement of a rod 36 so that displacement in a given direction advances the counter mechanism 30 a digit of its sequence.

A two state device or mechanism 40 is interposed between reels 14, 16 and positionally mounted in supporting relation from the casing 12, and including an articulated member 42 centered for articulation or pivoting about hinge or pivot 44 and and having ends of the articulated member 42 mounted by respective couplings 46, 48, adjoining the casing 12. The distal end 50 adjacent rotatable coupling 46 is coupled to the rod 36 shown having its first end coupled to the counter mechanism 30, as described above.

Figure 2:
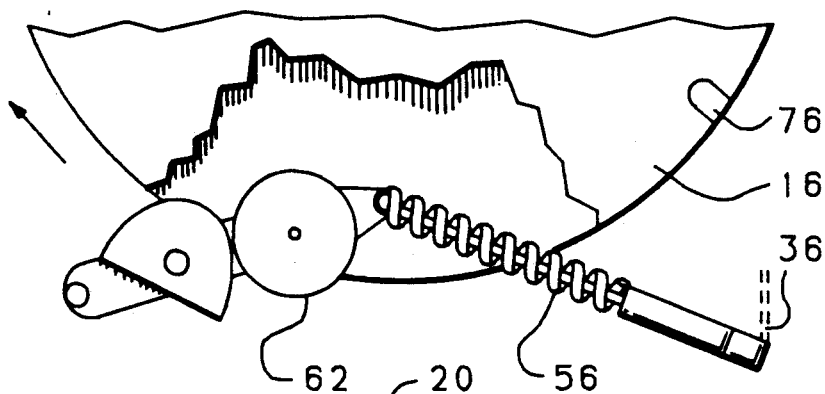
FIG. 2 is a partial plan view of one reel of a video tape cassette and recorder of the invention illustrating a normal operation mode thereof.
Figure 3:
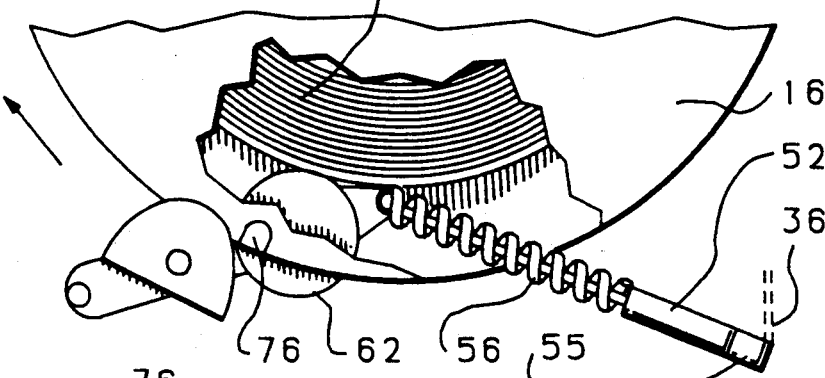
FIG. 3 is a partial plan view of one reel of a video tape cassette and recorder of the invention illustrating a normal operation mode thereof.
Figure 4:
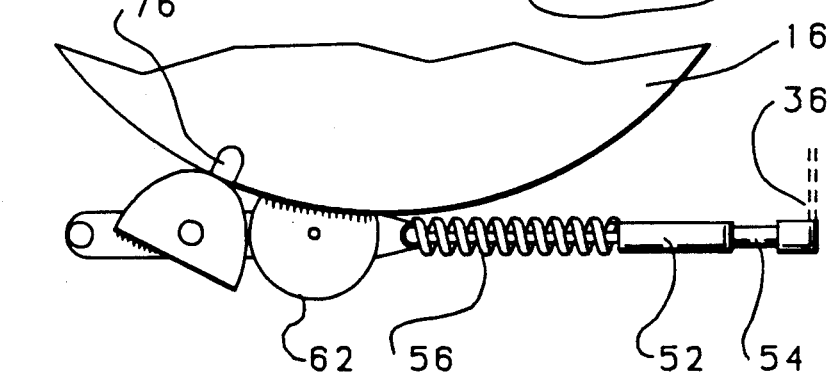
FIG. 4 is a partial plan view of one reel of a video tape cassette and recorder of the invention illustrating a normal operation mode thereof.
Figure 6:
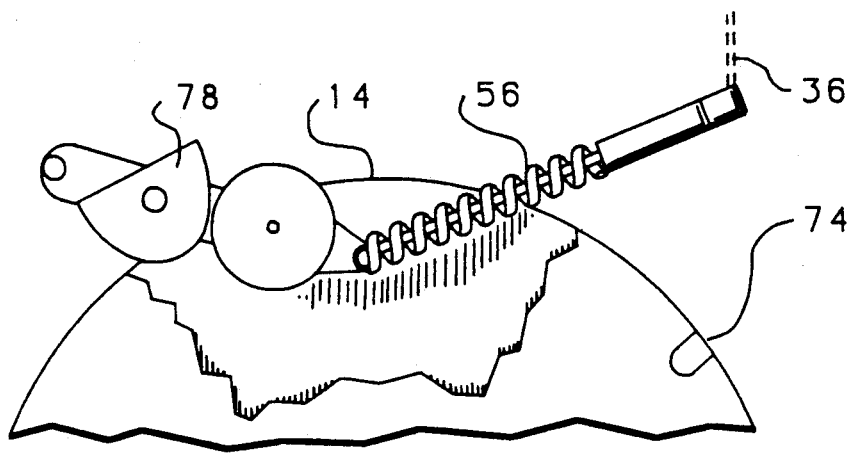
FIG. 6 is a partial plan view of one reel of a video tape cassette and recorder of the invention illustrating a normal operation mode thereof.
Figure 7:
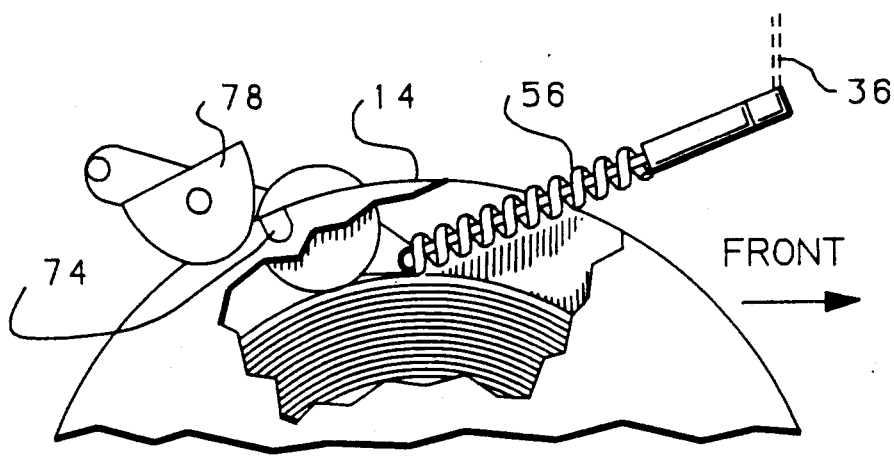
FIG. 7 is a partial plan view of one reel of a video tape cassette and recorder of the invention illustrating a normal operation mode thereof.
Figure 8:
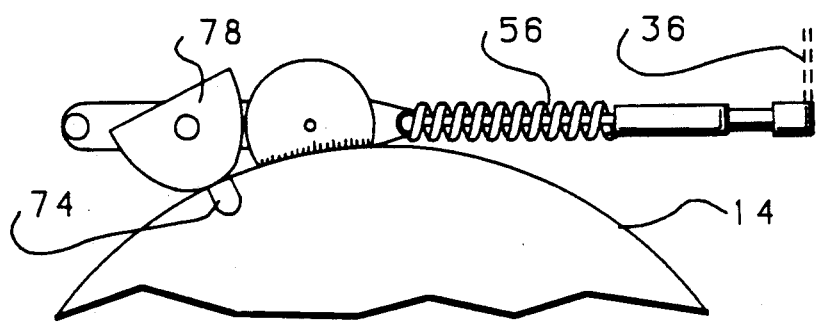
FIG. 8 is a partial plan view of one reel of a video tape cassette and recorder of the invention illustrating a normal operation mode thereof.

The rotatable coupling 46 shown in FIG. 4 includes a slide 52 affixed thereto which is a hollow passway for passage of a slide rod 54 terminating in an end cap 55 pivot coupled to the rod 36; the rod 54 is spring loaded and biassed so the end cap 55 tends by action of spring 56 to be positioned adjacent the slide 52 and due to the parameter, including the length of the articulated member 42 and its support at rotatable coupling 46, 48, thus forms a two state stable device so that its pivot 44 is stably positioned toward either of the reels 14, 16, as shown in FIG. 2, or FIG. 6, prior to its roller 62, described below, is seen to engage the collected film or tape 20, shown in FIG. 3 and FIG. 7. FIGS. 4 and 8, of course, show the mid-point of the location of the two state stable device or mechanism 40.

Figure 5:
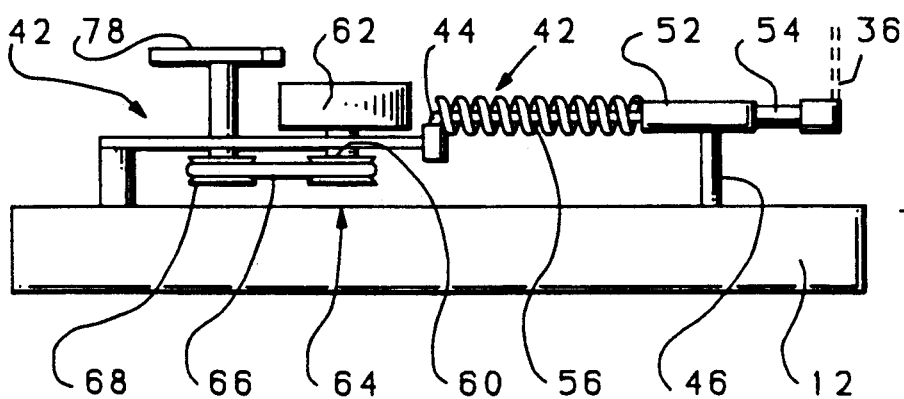
FIG. 5 is a side elevation view of FIG. 5.

The two state stable mechanims 40 is provided at an intermediate area thereof and proximate the pivot 44 with a rotatable shaft 60 shown in FIG. 5 having a follower wheel or roller 62 disposed at an upper portion and a pulley 64 disposed at a lower portion of the shaft 60. The pulley 64 coupled by a belt 66 is seen to drive pulley 68 when rotation is caused by the roller 62 engaging a rotating accumulated spiral of tape 20 on take up reel 14 as shown in FIG. 7, and of tape 20 on supply reel 16 as shown in FIG. 3, respectively.

FIGS. 4 and 8 show the midposition of the two state stable mechanism 40, and when the tape collected on the supply reel 16 for FIG. 3 or the take-up reel 14 for FIG. 7, drives the two state stable mechanism 40 beyond a center position, the spring 56 causes the two state stable mechanism 40 to drive into its other state of stability. While this action is within the purview of the invention, positive means accords this operation and result including each of the reels 14, 16 being provided respectively with projecting knobs or nubs 74, 76 on peripheral portions of the respective reels 14, 16, so that a rotating cam 78 on a distal end of the same shaft 68, rotates about its axis, and positive flipping of the two state stable mechanism 40 is achieved when the cam 78 engages the nub 74 on the real 14, as shown in FIG. 7, or cam 78 engages the nub 76 on reel 16, as shown in FIG. 3, each engagement thus causing positive displacement of the mechanism 40 to its other respective state. The mechanism 40 performs essentially as a flip flop device or mechanism well known in the art and its form, operation and configuration may be mechanically only, hydraulic, electrical, and the like.

The apparatus of the counting the usage tape device in a recorder cassette 10 of the invention may be so constructed and arranged in its component parts that it may be assembled as a kit or in kit form.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to falling within the scope of the invention.

What is claimed and desired to be secured by Letters patent is:

1. A device for counting usage of a tape cassette comprising
    first pivot means on a casing for receiving a hub and including means for driving a take-up reel,
    second pivot means on the casing for receiving a hub of a supply reel having tape fed onto the take-up reel and being spacially disposed from the first pivot means,
    a mechanism for counting usage including a two state stable device, follower wheel means, positive displacement means, and a counter,
    the two state stable device mounted on the casing interpositioned between the take-up reel and the supply reel, and including an articulated member positionable to indicate one of two alternative states of stability,
    the follower wheel means being mounted on the articulated member for engagement with tape accumulation on the take-up reel when the tape on the take-up reel contacts the tape accumulation on the take-up reel,
    the positive displacement means including projection means on the take-up reel for engaging the positive displacement means for displacing the two state stable device from one of the two alternative states of stability to another alternative state, and
    the counter having at least two counting wheel means for displaying digital indicia thereon and including means being actuable by and responsive to displacement action received from the two state stable device.

2. The apparatus of claim 1 wherein
    the articulated member comprises two pivotally connected members, and
    one of the two connected members is of fixed length and another of the two connected members includes hollow passway means for passage of a slide rod which is spring loaded for displacement to one of the said two alternative states.

3. The apparatus of claim 1 wherein
    the follower wheel means is a roller mounted on the articulated member having a fixed length member, and
    the displacement means provides for displacement of the articulated member from the one state to the other state of stability when the positive displacement means engages the projection on either the supply reel or the take-up reel.

* * * * *